Patented July 9, 1946

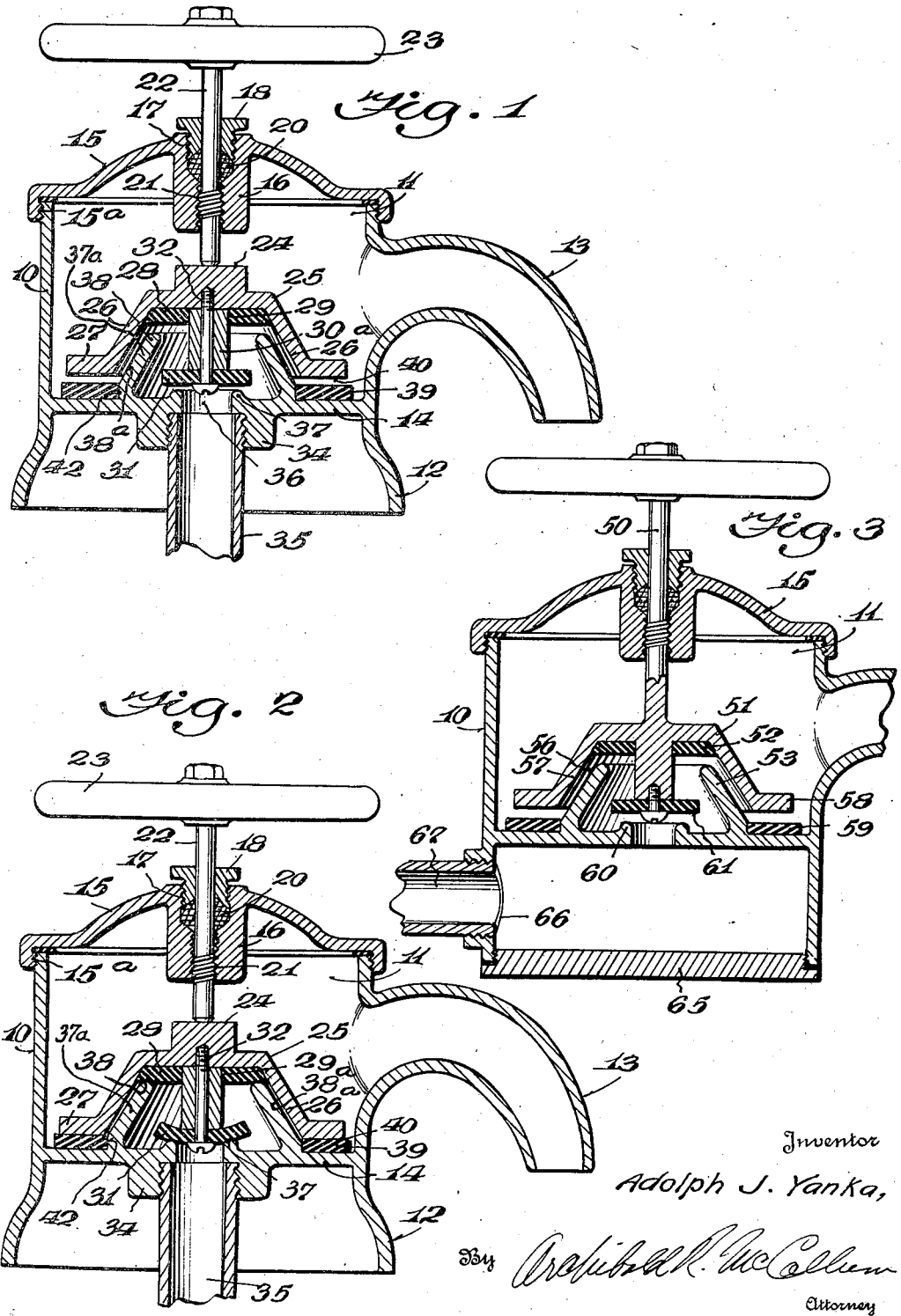

2,403,777

UNITED STATES PATENT OFFICE 2,403,777

VALVE FOR CONTROLLING DISTRIBUTION OF FLUIDS

Adolph J. Yanka, University Park, Md.

Application April 16, 1943, Serial No. 483,314

8 Claims. (Cl. 251—27)

This invention relates to water distribution, and more particularly to valves and faucets.

A primary object of this invention resides in constructing valves and faucets with plural seats and washers to provide leak-proof joints thereof.

A further object of the invention is to provide a valve which will be simple in construction and reliable in operation.

Another object of the invention is to provide a valve construction which will be durable in long-continued use while being economical to manufacture and maintain.

An additional object of the invention is to provide a valve construction which may at any time readily be tightly closed and characterized by a plurality of sealing elements designed and disposed so as to be individually readily replaced.

Another object of the invention is to provide a valve having three or more sealing elements which will be mutually complementary while individually efficient completely to seal the valve.

In a preferred embodiment the invention includes a cylindrical faucet manually actuated by an upper control handle and characterized internally by a series of ports, each port being defined by a valve seat.

One of the valve seats consists of a frusto-conical annulus in axial alignment with a superposed cup inverted thereover. Two replaceable sealing elements are carried by the inverted cup for engaging fixed seats while the third sealing element comprises an annular washer disposed around the frusto-conical seat and engaged by the lower edge of the inverted cup to establish a third sealing point. The adjacent surfaces of the frusto-conical seat and the inverted cup may have equal angularity, thereby insuring their coincidence when the valve is closed to establish a fourth seal therebetween. One of the sealing elements carried by the inverted cup seats ahead of the other whereby to insure sequential sealing engagement when desird.

In a modified form of the invention, the three washer-type sealing elements engage simultaneously, and the frusto-conical cup is integral with the stem of the control handle whereby a rotation of the inverted cup with respect to the frusto-conical seat characterizes opening and closing motions of the valve.

With these and other objects, the invention resides in the novel features of construction and arrangement of elements hereinafter to be more fully set forth and illustrated in the accompanying drawing and defined in the appended claims.

Referring to the following detailed description and the drawing forming a part thereof, reference is made to—

Figure 1, showing a vertical section of a faucet showing one form of the invention in open-valve position;

Figure 2 is a corresponding view showing the faucet in closed position; and

Figure 3 is a vertical section of a modified form of the invention, the valve being in open position.

Referring to the drawing wherein similar reference numerals are used to designate identical parts, a cylindrical faucet body 10 has an upper edge 11 and depending skirt 12 with a discharge orifice 13 projecting laterally therebetween. A wall 14 closes the faucet at the bottom while the top is closed by a cover 15 attached in screw-threaded fasion at 15a. An axial boss 16 depends inwardly on cover 15 and has an axial screw-threaded recess 17 and a nut 18. The boss and nut comprise a stuffing box having packing 20, and there is connected coaxially therein by screw threads 21, stem 22 for actuating the valve. The outer end of stem 22 is provided with handle 23 for a manual actuation in a manner which will be apparent from the drawing. The inner end of stem 22 may abut face 24 of an inverted cup 25 having a depending diverging wall 26 terminating in a flat horizontal rim 27. An annular washer 28 is carried in cup 25 and has axial recess 29 for accommodating rigidly connected tube 30 which supports on its outer end washer 31, the washer, tube and cup being held in firm assembly by screw 32 threaded firmly in the base of cup 25.

The under-surface of wall 14 has a depending boss 34 recessed to receive tightly fitting supply pipe 35 directly communicating with central port 36 surrounded, internally of the faucet, with an upstanding annular ridge 37 constituting a seat for washer 31.

Ridge seat 37 is surrounded by a concentric frusto-conical wall 37a the upper annular valve seating rim 38 of which constitutes a valve seat for sealing element 28 carried by inverted cup 25. It will be understood that the ratio of clearance between washer 28 and wall 37a and washer 31 and ridge 37 is such that when the cup 25 is lowered upon frusto-conical rim 38 that washer 31 seats the ridge 37 before washer 28 seats on rim 38. This provision for sequential seating of the plural valve faces assists in maintaining effective sealing operation in the faucet with a minimum of pressure being exerted at handle 23.

An annular washer 39 rests on wall 14 surrounding the frusto-conical wall 37a. The under-surface of cup rim 27 seats upon washer 39 when the cup is lowered, the smooth flat face 40 and washer 39 thus acting as a third seal and preferably becoming effective simultaneously with the seating of washer 28 on wall 37a.

From the foregoing, it will be observed that the triple seal thus far described may be effective with a minimum of pressure applied the control handle 23. When the faucet is turned on so as to permit flow therethrough, the water pressure of the system will permit ready and unrestricted flow through pipe 35, around washer 31 outwardly through frusto-conical wall 37a, thence between angularly coinciding wall and cup surfaces, 38a and 26a respectively, between washer 39 and cup rim face 40 through the faucet body and outwardly by way of spout 13. In this operation the pressure of the water of course will sustain the weight of inverted cup 25 readily without diminution of flow. The dimensions of the several ports or passages are proportioned to permit passage of fluid; for example, it will be observed that the cross-sectional areas of the ports at 36, 38 and 40 are not restricted by the successively larger valve elements lying therein. In this operation it will be apparent that any solid matter, such as sediment, sand or scale will be continually flushed through the valve elements by water pressure, since the valve elements have been especially designed to avoid any catch pockets wherein such hard material may become trapped to deleteriously affect the seating of the several sealing elements. In this connection, vertical wall 42 supports washer 39. It will be apparent that the internal diameter of washer 39 is such as to permit it snugly to engage wall 42 to retain firm placement thereon, and a similar close engagement characterizes the support of washer 28 on tube 30.

It will be apparent that in the normal operation of the construction described, as for example, in the distribution of very hot water, the sealing elements will more or less rapidly deteriorate, thus tending adversely to affect the efficiency of the seal obtainable thereon. Any resultant evidence of leaking may be immediately corrected by tightening the handle 23 and such correction will be obtainable with a minimum of additional pressure so as to insure maintenance of efficiency of the faucet without requiring the establishment of destructive pressure upon the sealing elements. When, through long usage, the washers are worn down, the fourth seal between coinciding surfaces 26a and 38a will become effective so that the final condition of the faucet before ultimate repair is characterized by seals at the ridge 37, rim 38, between surfaces 26a and 38a and at rim face 40.

Assembly and repair of the faucet above described is simple and involves merely the removal of cover 15 and lifting of cup 25 from the faucet body. Replacement of any or all of the several washer elements is then convenient to the unskilled workman and is but the work of a few minutes. None of the washer elements are of special configuration and no special dies will be required for their manufacture. The concentric disposition of the several valve elements coaxially within the faucet body insures at all times that the inverted cup 25 will not become dislocated therein, but on the contrary, due to the cooperation of adjacent surfaces, 26a and 38a, the inverted cup will always automatically be maintained properly centered with respect to the frusto-conical wall 37a.

The diameter of washer 39 is preferably less than that of wall 14, hence its removal or replacement may readily be accomplished by insertion of any sharp tool thereunder.

With respect to the modified construction shown in Figure 3, attention is directed to the circumstances that handle stem 50 is attached to the inverted cup 51 whereby said cup will rotate with the handle during adjustment of the valve for controlling the operation of the faucet. The form of Figure 3 is basically the same as the preferred form except for the above connection, the manner of attachment to the water supply system and the elimination of the sequential seating of the valve elements. For instance, the washer 52 will engage cone 53, the coincident surfaces 56 and 57 provide the frusto-cone seal, rim 58 forms a sealing connection with annular washer 59 and rim 60 forms seat for washer 61 carried by cup 51. In the latter connection, it will be apparent that the ratio of clearance between cone 53 and washer 52 and ridge 60 and washer 61 is such that the sealing actions will be simultaneous.

The modified form of Figure 3 may be utilized, for example, where the water supply must be brought in on the horizontal rather than the vertical. The modification is adapted to this requirement by providing a tightly-closed bottom 65 and lateral orifice 66, at which is rigidly connected water supply pipe 67.

From the foregoing, it will be observed that both forms of the invention are characterized by internal elements which are essentially frusto-conical in the axis of the faucet body. While there has been described hereinabove faucet bodies of relatively cylindrical design, it will be apparent that the valve structure described may be utilized satisfactorily without materially limiting the external design of the faucet. For example, the external design of the faucet may be changed in many different ways to provide a pleasing variety of designs as desired by the manufacturer and purchaser, without interfering in any degree with the efficiency of the valve presented resulting from its construction as defined hereinbelow. The invention is not limited as to material, inasmuch as the washer or sealing elements may be made of rubber, plastic, fiber or any conventional materials varying, if desired, considerably in hardness, flexibility, composition and resiliency. The several parts of the faucet and valve structure other than the washer or sealing elements may be of any suitable metal or plastic material.

Whereas, the foregoing describes adaptation of the invention to faucets and valves, it is pointed out that the invention is not to be limited thereby, inasmuch as it is adaptable to any occasions where the efficient and reliable control of liquid flow without leak is desired.

Having thus described my invention, what I claim and desire to protect by Letters Patent is:

1. A faucet having a casing enclosing a valve body, a supply orifice and discharge orifice spaced in said body and a port therein communicating with said orifices and surrounded by a frusto-conical wall comprising a valve seat, an inverted cup carrying a washer for engaging said seat to form a sealing element for said port, a second washer carried by said inverted cup for extension into said frusto-conical wall, an annular ridge arranged between said wall and said port constituting a valve seat for said second washer, a third washer surrounding said frusto-conical wall, a peripheral rim on said cup disposed for sealing engagement with said third washer and rotatable control means in said body for controlling pressure of said washers on said seats.

2. A faucet having a casing enclosing a valve body, a supply orifice and discharge orifice spaced in said body and a port therein communicating with said orifices and surrounded by a frusto-conical wall comprising a valve seat, an inverted cup carrying a washer for engaging said seat to form a sealing element for said port, a second washer carried by said inverted cup for extension into said frusto-conical wall, an annular ridge arranged between said wall and said port constituting a valve seat for said second washer, a third washer surrounding said frusto-conical wall, a peripheral rim on said cup disposed for sealing engagement with said third washer and rotatable control means in said body for controlling pressure of said washers on said seats, said sealing elements seating and unseating sequentially upon actuation of said control means.

3. A faucet having a casing enclosing a valve body, a supply orifice and discharge orifice spaced in said body and a port therein communicating with said orifices and surrounded by a frusto-conical wall comprising a valve seat, an inverted cup carrying a washer for engaging said seat to form a sealing element for said port, a second washer carried by said inverted cup for extension into said frusto-conical wall, an annular ridge arranged between said wall and said port constituting a valve seat for said second washer, a third washer surrounding said frusto-conical wall, a peripheral rim on said cup disposed for sealing engagement with said third washer and rotatable control means in said body for controlling pressure of said washers on said seats, said control means engaging said inverted cup slidably whereby controlled action of the inverted cup is lineal rather than rotary.

4. A faucet having a casing enclosing a valve body, a supply orifice and discharge orifice spaced in said body and a port therein communicating with said orifices and surrounded by a frusto-conical wall comprising a valve seat, an inverted cup carrying a washer for engaging said seat to form a sealing element for said port, a second washer carried by said inverted cup for extension into said frusto-conical wall, an annular ridge arranged between said wall and said port constituting a valve seat for said second washer, a third washer surrounding said frusto-conical wall, a peripheral rim on said cup disposed for sealing engagement with said third washer and rotatable control means in said body for controlling pressure of said washers on said seats, said control means being rigidly attached to said inverted cup whereby the controlled action of said cup is rotary.

5. A faucet having a casing enclosing a valve body, supply and discharge orifices spaced in said casing and a port in said body communicating with said orifices and surrounded by a wall comprising a valve seat, a washer-carrying cup adjustable with respect to said wall to form a sealing element for said port, a washer carried by said cup for extension within said wall, an annular ridge constituting a valve seat for said washer arranged between said wall and said port, another washer surrounding said wall, a peripheral rim on said cup disposed for sealing engagement with said other washer and control means in said body for controlling pressure of said washers on said seats.

6. A valve having a casing and a fixed internal wall spaced within said casing and having a valve-seating rim, an external surface and a base, a movable cup disposed around said wall and having a wall supporting a valve-seating rim, said cup wall having an internal rigid surface adapted to engage the external surface of said internal wall, a sealing surface within said cup for receiving said internal wall rim and a solid sealing surface around said wall base for receiving said cup rim.

7. A valve including an enclosing valve casing, a supply orifice and discharge orifice spaced in said casing and a port therein communicating with said orifices and surrounded by a frusto-conical wall comprising a valve seat, an inverted cup including a sealing surface for engaging said seat to form a sealing element for said port, a second sealing surface on said inverted cup for extension into said frusto-conical wall, an annular ridge arranged between said wall and said port constituting a valve seat for said second sealing surface, a third sealing surface surrounding said frusto-conical wall, and a peripheral rim on said cup disposed for sealing engagement with said third sealing surface.

8. A valve including an enclosing valve casing, a supply orifice and discharge orifice spaced in said casing and a port therein communicating with said orifices and surrounded by a frusto-conical wall comprising a valve seat, an inverted cup including a sealing surface for engaging said seat to form a sealing element for said port, a second sealing surface on said inverted cup for extension into said frusto-conical wall, an annular ridge arranged between said wall and said port constituting a valve seat for said second sealing surface, a third sealing surface surrounding said frusto-conical wall, a peripheral rim on said cup disposed for sealing engagement with said third sealing surface, and control means in said casing for determining relative pressure between said sealing surface and said seats.

ADOLPH J. YANKA.